United States Patent Office 3,793,367
Patented Feb. 19, 1974

1

3,793,367
TRIALKYLTRIDECATETRAENDIOIC ACIDS
AND ESTERS
John D. Diekman, Palo Alto, Calif., assignor to Zoecon
Corporation, Palo Alto, Calif.
No Drawing. Filed Nov. 8, 1972, Ser. No. 304,704
Int. Cl. C07c 69/52
U.S. Cl. 260—485 R                9 Claims

ABSTRACT OF THE DISCLOSURE

Aliphatic hydrocarbon substituted tetra-olefinic terminal dicarboxylic esters and acids, useful for the control of insects.

This invention refers to novel unsaturated hydrocarbon dicarboxylic esters and acids useful as insect control agents. More particularly, the compounds of the present invention are represented by the following Formula A:

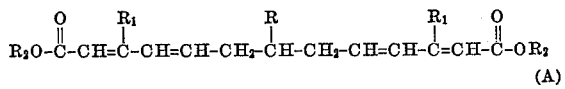

wherein,

R is methyl or ethyl;
$R_1$ is lower alkyl; and
$R_2$ is hydrogen or lower alkyl.

The compounds of Formula A are useful for the control of insects. The utility of these compounds as insect control agents is believed to be attributable to their juvenile hormone activity. They are preferably applied to the immature insect, namely, during the embryo, larvae or pupae stages in view of their effect on metamorphosis and otherwise causing abnormal development leading to death or to inability to reproduce. These compounds are effective control agents for heteropterans, such as Lygaeidae, Miridae and Pyrrhocoridae; homopterans, such as Aphididae, Coccidae and Jassidae; lepidopterans, such as Pyralidae, Noctuidae and Gelechiidae; coleopterans, such as Tenebrionidae, Crysomelidae and Dermestidae; dipterans, such as Culicidae, Muscidae and Sarcophagidae; and other insects. The compounds can be applied at low dosage levels of the order of 0.01 µg. to 10 µg. per insect. Suitable carrier substances include liquid or solid inert carriers, such as water, acetone, xylene, mineral or vegetable oils, talc, vermiculite, natural and synthetic resins and silica. Treatment of insects in accordance with the present invention can be accomplished by spraying, dusting or otherwise contacting the insect, directly or indirectly, with one or more compounds of Formula A. Generally, a concentration of less than 25% of the active compound is employed. The formulations can include insect attractants, emulsifying agents or wetting agents to assist in the application and effectiveness of the active ingredient.

In the description hereinafter, each of R–$R_2$ is as defined above unless otherwise specified.

The esters of the present invention of Formula A' ($R_2 \neq$ hydrogen) can be prepared as outlined below:

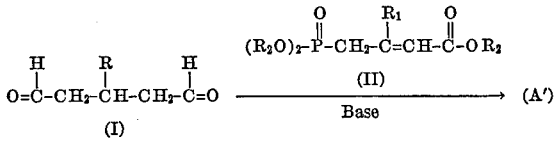

In the above synthesis, 1 mol of a dialdehyde of Formula I, such as 3-methylglutaraldehyde or 3-ethylglutaraldehyde, is condensed with 2 mols of the carbanion of a phosphonate of Formula II to yield a dicarboxylic ester of Formula A'. The reaction is generally carried out at about room temperature, although higher and lower temperatures can be used, and may take from a few minutes to several hours to come to completion. An organic aprotic solvent inert to the reaction, such as the hydrocarbons, ethers, dimethylsulfoxide, dimethylformamide, and the like, is used and a base, such as sodium hydride, sodium methoxide, sodium hydroxide or similar, to generate the carbanion of the phosphonate, is also required. Suitable conditions for the formation of phosphonate anions and their reaction with carbonyl compounds have been described by Pattenden and Weedon, J. Chem. Soc. ©, 1984 and 1997 (1968). Phosphonates of Formula II are either commercially available or can be prepared from a trialkylphosphite and the appropriate bromocarbonyl compound as described by Pattenden and Weedon, supra.

Dialdehydes of Formula I can be obtained in the market or prepared as reported in the literature. See, for example, Orig. Synth. Coll., vol. IV, 661 (1963).

The esters of Formula A' are converted into the corresponding acids by hydrolysis with base, such as potassium carbonate, sodium hydroxide, and the like, in an organic solvent, such as methanol or ethanol. Other esters of the present invention can be prepared by transesterification or conversion of the acid into the acid halide by treatment with thionyl chloride or bromide, oxalyl chloride or bromide, phosphorus pentabromide, or the like, in an organic solvent inert to the reaction, such as benzene, ether or similar, and then reacting the acid halide with the alcohol corresponding to the ester moiety desired.

The term "lower alkyl," as used herein, refers to a straight or branched chain saturated aliphatic hydrocarbon group having a chain length of one to six carbon atoms, e.g., methyl, ethyl, propyl, i-propyl, n-butyl, s-propyl, n-butyl, s-butyl, t-butyl, pentyl and hexyl.

The following examples are provided to illustrate the practice of the present invention. Temperature is given in degrees centigrade.

EXAMPLE 1

To a mixture of 1.14 g. (0.01 mole) of 3-methylglutaraldehyde (3-methylpentanedial), 6.13 g. (0.02 mole) of triisopropyl-4-phosphono-3-methyl - 2 - butenoate and 20 ml. of dry dimethylformamide, stirring under nitrogen, is added 0.88 g. (0.022 mole) of ground sodium hydroxide over a period of 15 minutes while maintaining the temperature between 25°–30°. The reaction mixture is stirred under these conditions for about three hours. Hexane and cold water are then added and the organic layer separated, washed with water and brine, dried over magnesium sulfate and evaporated in vacuo to yield diisopropyl 3,7,11-trimethyltrideca - 2,4,9,11 - tetraen-1,13-dioate (A; each of R and $R_1$ is methyl, each of $R_2$ is isopropyl), which can be purified by chromatography or distillation.

EXAMPLE 2

3-methylglutaraldehyde, 0.1 mole, in 10 ml. of dry dimethylsulfoxide, is slowly added to a mixture of triethyl-4-phosphono-3-methyl-2-butenoate (58.4 g., 0.2 mole) and ground sodium hydroxide (8.8 g., 0.22 mole) in 30 ml. of dry dimethylsulfoxide, stirring at 0° under nitrogen. When addition is complete, the reaction mixture is allowed to stir at room temperature for six hours. Hexane and cold water is added. The hexane layer is washed with water and then brine, dried over calcium sulfate and concentrated in vacuo to give diethyl 3,7,11-trimethyltrideca-2,4,9,11-tetraen-1,13-dioate, which can be further purified by chromatography and/or distillation.

EXAMPLE 3

3-ethylglutaraldehyde is reacted with trimethyl-4-phosphono-3-methyl-2-butenoate and sodium hydroxide with the method of Example 1 or 2, to prepare dimethyl 3,11-dimethyl-7-ethyltrideca-2,4,9,11-tetraen-1,13-dioate (A; R is ethyl, each of $R_1$ and $R_2$ is methyl).

EXAMPLE 4

To 3 g. of dimethyl 3,11-dimethyl-7-ethyltrideca-2,4,9,11-tetraen-1,13-dioate in 200 ml. of methanol is added 3 g. of potassium hydroxide in 30 ml. of water. The mixture is then diluted with water, neutralized and extracted with ether. The ether extracts was washed with water, dried over calcium sulfate and evaporated to yield 3,11-dimethyl-7-ethyltrideca-2,4,9,11-tetraen-1,13-dioic acid.

EXAMPLE 5

Thionyl chloride (2 g.) is added with stirring at room temperature to 0.5 g. of the dicarboxylic acid of Example 4 and the mixture heated at about 50° for 10 minutes. Excess thionyl chloride is removed by evaporation and then benzene (6 ml.) and t-butyl alcohol (4 ml.) is added and the mixture left at room temperature for about two hours. Ether and saturated sodium bicarbonate is added; the organic phase is separated, washed with water and brine, and dried over magnesium sulfate. By evaporation of the solvent, there is obtained di-t-butyl 3,11-dimethyl-7-ethyltrideca-2,4,5,9,11-tetraen-1,13-dioate.

By using other alcohols in place of t-butyl alcohol, such as n-propyl alcohol, isopentyl alcohol, etc., the corresponding di-esters are prepared.

What is claimed is:

1. A compound selected from those of the following Formula A:

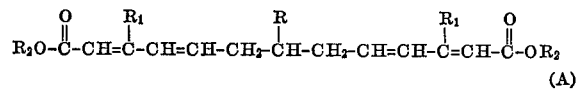

(A)

wherein,

R is methyl or ethyl;
$R_1$ is lower alkyl; and
$R_2$ is hydrogen or lower alkyl.

2. A compound according to claim 1 wherein $R_1$ is methyl or ethyl.

3. A compound according to claim 2 wherein $R_2$ is lower alkyl.

4. A compound according to claim 3 wherein each of R and $R_1$ is methyl.

5. A compound according to claim 4 wherein $R_2$ is methyl, ethyl or isopropyl.

6. A compound according to claim 2 wherein $R_1$ is methyl and $R_2$ is methyl.

7. A compound according to claim 2 wherein $R_1$ is methyl and $R_2$ is ethyl.

8. A compound according to claim 2 wherein $R_2$ is hydrogen.

9. A compound according to claim 8 wherein each of R and $R_1$ is methyl.

References Cited

UNITED STATES PATENTS 3,177,226   4/1965   Stilz et al. _____ 260—485

LORRAINE A. WEINBERGER, Primary Examiner

E. J. SKELLY, Assistant Examiner

U.S. Cl. X.R.

260—537 N; 424—313, 317